United States Patent
Brasseur et al.

(10) Patent No.: US 7,286,574 B2
(45) Date of Patent: Oct. 23, 2007

(54) INFRARED LASER

(75) Inventors: Jason Kenneth Brasseur, Colorado Springs, CO (US); David Kurt Neumann, Colorado Springs, CO (US); Charles Wesley Haggans, Colorado Springs, CO (US)

(73) Assignee: Neumann Information Systems, Inc., Colorado Springs, CO (US)

( * ) Notice: Subject to any disclaimer, the term of this patent is extended or adjusted under 35 U.S.C. 154(b) by 311 days.

(21) Appl. No.: 10/968,747

(22) Filed: Oct. 19, 2004

(65) Prior Publication Data
US 2005/0111509 A1  May 26, 2005

Related U.S. Application Data

(60) Provisional application No. 60/523,474, filed on Nov. 19, 2003.

(51) Int. Cl.
H01S 3/30 (2006.01)
H01S 3/22 (2006.01)
H01S 3/13 (2006.01)

(52) U.S. Cl. .............. 372/4; 372/55; 372/57; 372/29.011

(58) Field of Classification Search .......... 372/55–57, 372/4
See application file for complete search history.

(56) References Cited

U.S. PATENT DOCUMENTS

| | | | | |
|---|---|---|---|---|
| 3,928,816 A | * | 12/1975 | Hartwick et al. | 372/4 |
| 4,061,921 A | * | 12/1977 | Cantrell et al. | 250/423 P |
| 4,122,853 A | * | 10/1978 | Smith | 606/4 |
| 4,194,813 A | * | 3/1980 | Benjamin et al. | 359/297 |
| RE30,898 E | * | 4/1982 | Cantrell et al. | 359/327 |
| 4,367,552 A | * | 1/1983 | Jacobson | 372/23 |
| 5,033,051 A | * | 7/1991 | Werner | 372/3 |
| 5,414,723 A | * | 5/1995 | Krapchev | 372/3 |
| 6,151,337 A | | 11/2000 | Carlsten et al. | |
| 6,275,250 B1 | * | 8/2001 | Sanders et al. | 347/247 |
| 6,343,174 B1 | * | 1/2002 | Neuberger | 385/123 |
| 6,392,789 B1 | * | 5/2002 | Paek et al. | 359/341.1 |
| 6,489,985 B1 | * | 12/2002 | Brodsky et al. | 347/247 |
| 6,731,426 B2 | | 5/2004 | Brasseur et al. | |
| 6,765,945 B2 | | 7/2004 | Sandstrom et al. | |
| 6,790,228 B2 | * | 9/2004 | Hossainy et al. | 623/1.46 |
| 6,885,683 B1 | * | 4/2005 | Fermann et al. | 372/25 |
| 2002/0125228 A1 | * | 9/2002 | Smart et al. | 219/121.62 |
| 2004/0228383 A1 | * | 11/2004 | Krupke | 372/75 |

* cited by examiner

Primary Examiner—Minsun Oh Harvey
Assistant Examiner—Phillip Nguyen
(74) Attorney, Agent, or Firm—Dale B. Halling

(57) ABSTRACT

An infrared laser has a seed laser with an optical seed output. A pump amplifier receives the optical seed output and has an amplified output. A molecular gas laser receives the amplified output and has an infrared optical output.

29 Claims, 7 Drawing Sheets

INFRARED LASER

RELATED APPLICATIONS

The present patent claims priority on provisional patent application Ser. No. 60/523,474, filed on Nov. 19, 2003, entitled "Fiber Laser Pumped Gas Lasers".

FIELD OF THE INVENTION

The present invention relates generally to the field of lasers and more particularly to an infrared laser.

BACKGROUND OF THE INVENTION

There is a desire for infrared lasers in the 1-7 micron range of the spectrum that are energy efficient and have watt level outputs. These devices are needed for remote sensing applications and aircraft self-defense applications. There are a number of molecular gas lasers that have operated in the spectral range of interest, but they all suffer from one or more problems. Chemical lasers used to produce light in this region of the spectrum require large chemical plants to generate the excited-state species required for lasing. In addition, the required chemicals are often volatile or hazardous. Electrical discharge lasers that operate in this region of the spectrum require large power generators to create the required electrical discharge. For many applications electrical discharge lasers are too large and heavy. In addition, they have a poor overall energy conversion rates. Present, optically pumped molecular lasers use inefficient solid-state lasers as pump sources. This results in the lasers being large, heavy and having poor energy conversion. Thus there exists a need for a 1-7 micron laser that is energy efficient, light weight and physically compact.

SUMMARY OF INVENTION

An infrared laser that overcomes these and other problems has a seed laser having an optical seed output. A pump amplifier receives the optical seed output and has an amplified output. The seed laser may be a diode laser. The seed laser may be a number of diode lasers. Each of the diode lasers has a different wavelength optical output. In one embodiment, the diode lasers are distributed feedback diode lasers. In another embodiment, the diode lasers are external cavity diode lasers. The seed laser may be a gas laser. The pump amplifier may be an optical fiber amplifier. The optical fiber amplifier may be a rare earth fiber laser coupled to a Raman fiber laser, and/or amplifier. A first optical resonator of the rare earth fiber laser may physically overlap a second optical resonator of the Raman fiber laser. A third optical resonator of the seed laser may physically overlap the second optical resonator. The pump amplifier may be a rare earth doped fiber amplifier.

A molecular gas, confined in a cell surrounded by a doubly resonant cavity receives the amplified seed output from the pump amplifier and has a red-shifted infrared optical output. The molecular gas may be optically resonant with the pump amplifier seed frequency, or the molecular gas may be Raman active. The doubly resonant cavity needs to be resonant with the pump amplifier seed frequency and the produced, red-shifted infrared output. The output of more than one amplifier may be coupled into the molecular gas. A feed-back loop comprising of a detection system and servo electronics, maintains the required resonant conditions for red-shifted laser operation. The molecular gas may be confined to a sealed cell, or the molecular gas may be flowing through the pump region in either a recirculating or one-time use configuration. The flowing configuration is useful for depopulating the lower lasing level and for heat removal for power scaling.

In one embodiment, an infrared laser has a seed laser with a seed optical output. An amplifier receives the seed optical output and has an amplified output. A gas molecular laser is pumped by the amplified output and has an infrared output. The amplifier may be a fiber amplifier. The gas molecular laser may contain a Raman active gas. The Raman active gas may be contained in a hollow core optical fiber. A feed-back system maintains the aforementioned resonance conditions.

In one embodiment, an infrared laser has a number of seed lasers. Each of the seed lasers has an optical output at a different wavelength. A fiber amplifier receives the optical output from each of the seed lasers and has multiple amplified optical outputs. A molecular gas laser is pumped by the resonant amplified optical outputs and lases at infrared wavelengths. The fiber amplifier may include a Raman fiber laser. The Raman fiber laser may be pumped by a rare earth fiber laser. A feed-back system maintains the a fore mentioned resonance conditions.

DETAILED DESCRIPTION OF THE DRAWINGS

Figure 1:
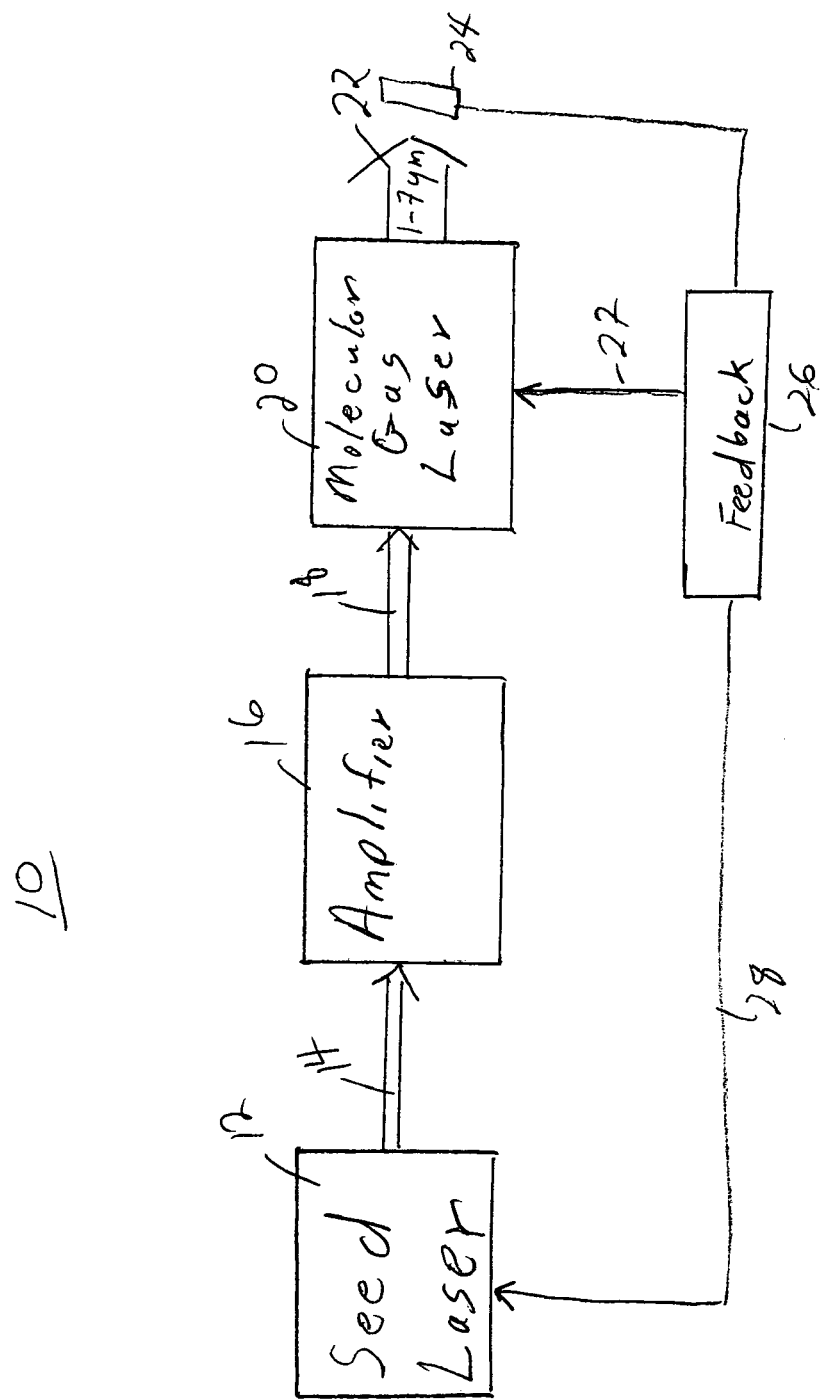
FIG. 1 is a block diagram of an infrared laser in accordance with one embodiment of the invention.

The infrared laser(s) described herein has output powers of several to tens of watts, in the 1-7 micron region of the electromagnetic spectrum and are power efficient, lightweight and less bulky than prior art designs. FIG. 1 is a block diagram of an infrared laser 10 in accordance with one embodiment of the invention. The infrared laser has a seed laser 12 that has an optical seed output 14. The optical seed output 14 is received by an amplifier or pump amplifier 16. The amplifier 16 has an amplified output 18 that is received by a molecular gas laser 20. The molecular gas laser 20 lases 22 between the 1-7 micron part of the spectrum. A detector 24 is coupled to the laser output 22. The detector 24 detects the power of the output 22. The detector 24 is coupled to a feedback system 26. The feedback system 26 is coupled 27 to the molecular gas laser 20 and adjusts a cavity length using piezoelectric devices to obtain maximum power output. The feedback 26 system is also coupled or has a feedback signal 28 sent to the seed laser 12 and adjusts the seed lasers output 14 wavelength to obtain a maximum power output 22. There may be two feedback signals 27 & 28 or one or the other of the signals may be used by the laser 10. Note that the term molecular gas laser includes both optically resonant gases, such as HX or DX gases where X=Br, Cl, F and I, or instead the gas is CO or $CO_2$ as the molecular medium; and Raman active molecular gases such as $H_2$, $D_2$, $N_2$, $O_2$, CO, $CO_2$, and $CH_4$. The list of gases is intended to be representative and not exclusive. Other modifications include having multiple seed laser seeding multiple amplifiers that then amplify the molecular gas laser.

Figure 2:
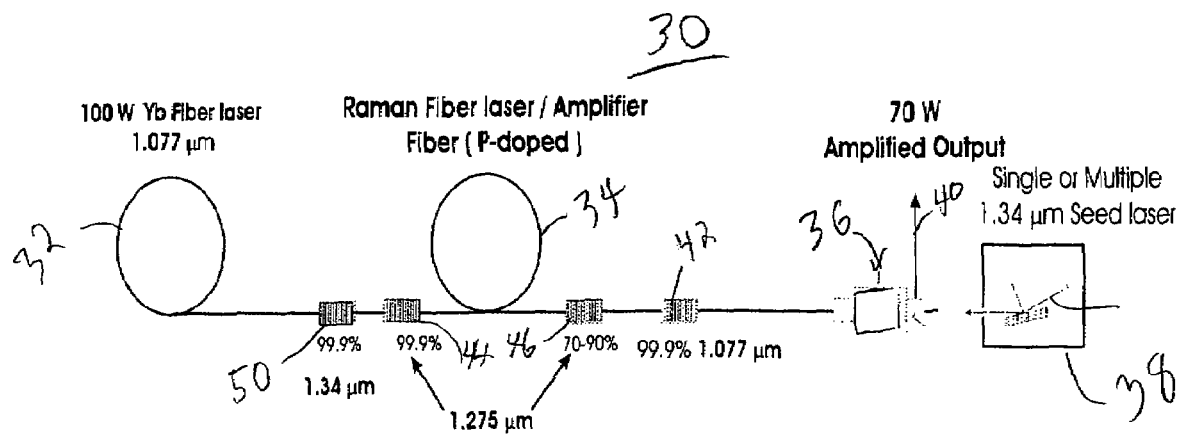
FIG. 2 is a schematic diagram of part of an infrared laser in accordance with one embodiment of the invention.

FIG. 2 is a schematic diagram of part of an infrared laser 30 in accordance with one embodiment of the invention. In this embodiment, an Yb (ytterbium) fiber laser 32 lases at 1.077 microns. The Yb fiber laser 32 is optically coupled to a Raman fiber laser 34 that is a P-doped fiber. The Raman fiber laser 34 lases at 1.275 microns, and creates a Raman fiber amplifier for wavelengths near 1.34 mircons. The Raman amplifier 34 is optically coupled to a polarization sensitive device 36. A seed laser(s) 38 is optically coupled to the polarization sensitive device 36. The seed laser 38 may lase at 1.34 microns and may be an ECDL (External Cavity Diode Laser). The amplified output 40 acts as a pump for the molecular laser shown in FIG. 3.

The Yb laser signal is reflected at the 1.077 micron grating (mirror) 42. The Raman laser cavity is defined by the 1.275 micron gratings (mirrors) 44, 46. In an alternate configuration, the Raman laser cavity could be completely encased by the Yb laser cavity by terminating the cavity at the 1.077 micron grating (mirror) 42.

Figure 3:
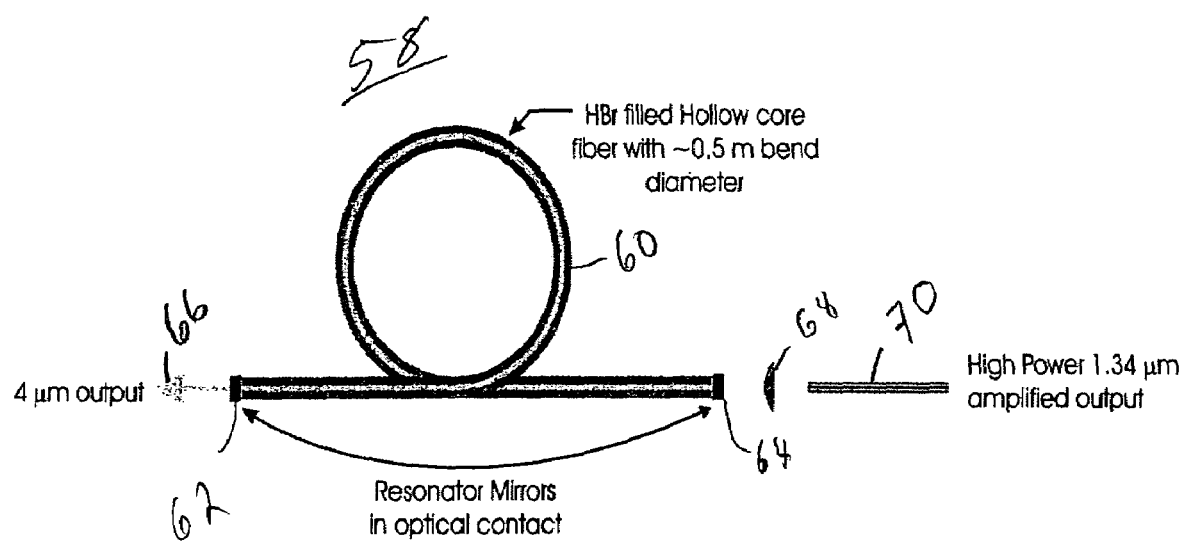
FIG. 3 is a schematic diagram of a hollow core fiber filled with a molecular gas in accordance with one embodiment of the invention.

FIG. 3 is a schematic diagram of a hollow core fiber filled with a molecular gas 58 in accordance with one embodiment of the invention. The diagram shows one embodiment of the gas laser 58 that may be used with the pump 30 of FIG. 2. A hollow core fiber 60 is filed with an optically resonant gas such as HBr. The end of the hollow core fiber 60 is sealed with mirrors 62 & 64. These mirrors 62 & 64 may be wavelength selective mirrors and in one embodiment select for a 4 micron output 66. In another embodiment, the mirrors 62 & 64 are reflective at two separate wavelengths, the laser output and the amplifier output. This creates a doubly resonant cavity. A doubly resonant cavity effectively increases the interaction length between the amplifier output 40 and the gas laser 58. When a doubly resonant cavity is not used a long length of the hollow core fiber 60 is used to obtain the long interaction length need for efficient pumping of the gas laser 58. The output 66 then reflects off the mirror 52 of FIG. 2 to form the output of the infrared laser 30. At the other end of the hollow core fiber 60 is a lens 68 that mode-matches the amplified 1.34 micron light 70 that has been amplified from the seed laser 38 (see FIG. 2). Lens 68 may be of a free-space type, or it may be of a GRIN lens type, allowing for integrated coupling of the 1.34 micron light 70 to the hollow core fiber 60. The lens 68 ensures efficient coupling, of the pump light to the lowest order mode of the hollow core fiber and this results in low loss for the pump laser and more even pumping of the gas in the hollow core fiber 60. The amplifier output 40 is a continuous wave output and the output 70 from the gas laser is a continuous wave output also. This is made possible by the efficiencies of the pump amplifier and the efficient coupling of the pump output into the gas laser.

The embodiment of the laser shown in FIG. 3 has the molecular gas contained in a hollow core fiber. It should be noted that the molecular gas can also be contained in a larger cell, with the cell embedded in either a linear or ring resonator configuration, giving a free-space implementation of the laser shown in FIG. 3.

The embodiment of the laser shown in FIGS. 2 & 3 matches the block diagram of FIG. 1 where the seed laser is laser 38, the amplifier is the Yb fiber laser 32 and the Raman fiber laser 34 and the molecular gas laser is laser 58.

The infrared laser 30 shown in FIGS. 2 & 3 has an Yb laser 32 as the pump source for a cascaded Raman fiber laser/amplifier 34 and amplifier system. The Raman amplifier is constructed such that the next Raman shift in the fiber is the wavelength corresponding to the desired narrow linewidth output. The Raman laser resonator increases the Raman gain at the desired narrow linewidth output due to resonant laser cavity enhancement. This reduces the required fiber lengths for significant Raman gains. It also reduces the effect of stimulated Brillouin scattering, allowing for high-power narrow-linewidth outputs compared to traditional Raman fiber amplifiers. Even higher powers can be achieved if the seed laser linewidth is artificially broadened. Artificial broadening is achieved by use of a modulated seed laser generated sidebands across the frequency range of interest. In the case of molecular lasers the optimal pump laser linewidth is approximately 250 MHz. The narrow linewidth output can be generated anywhere in the wavelength range of 1.1 microns—1.6 microns using standard silica based optical fibers which include: Ge doped cores and P doped cores. Use of non-silica fibers (e.g., fluoride) can extend this narrow linewidth output into the mid-infrared region (1.6-5 microns).

Figure 4:
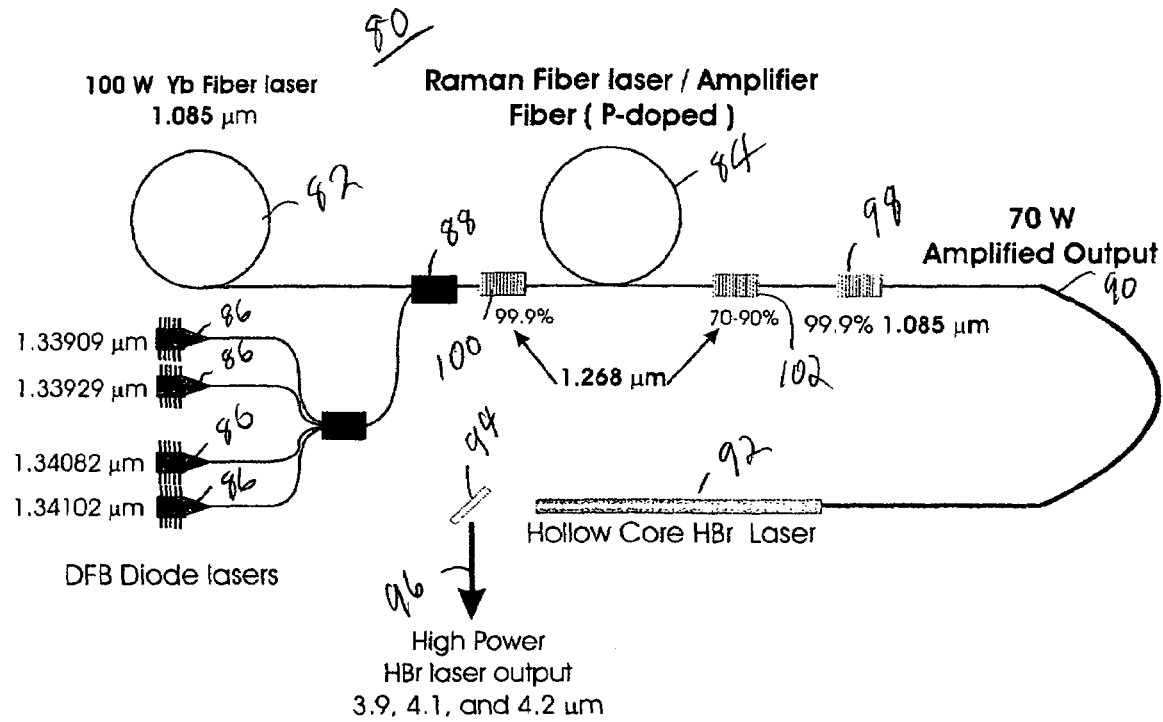
FIG. 4 is a schematic diagram of an infrared laser in accordance with one embodiment of the invention.

FIG. 4 is a schematic diagram of an infrared laser 80 in accordance with one embodiment of the invention. The laser has an Yb fiber laser 82 that lases at 1.085 microns. The fiber is coupled to a Raman fiber laser/amplifier 84. In one embodiment, the Raman fiber laser/amplifier 84 is replaced with a one pass Raman fiber amplifier. A plurality of laser diodes 86 are coupled to the Raman laser 84 by optical coupler 88. Each of the laser diodes 86 has an optical output at a different wavelength. In one embodiment, the laser diodes are distributed feedback (DFB) diode lasers. In another embodiment, the laser diodes are external cavity diode lasers (ECDL). In one embodiment, the diodes 86 may be replaced with diode pump Raman lasers as the seed source. The amplified output 90 is coupled by an optical fiber to a hollow core HBr laser 92. A mirror 94 redirects the output 96. The HBr laser may lase at a variety of wavelengths including 3.9, 4.1 & 4.2 microns and produce multiwatt or multi-tens of watts of output optical power depending on the input power. In this embodiment, the seed lasers are the diodes 86. Note that all the lasers described herein are continuous wave lasers. Note also, that additional laser/amplifiers 84 could be coupled to the hollow core laser 92 to give increased output power.

Similar to FIG. 2 this embodiment has the optical cavity of the Yb laser 82 terminate at mirror 98 which encapsulates the cavity of the Raman fiber laser 84 defined by mirrors 100 & 102. The use of multiple seed lasers provides the broadening for the amplified output 90 and provides for more efficient pumping of the molecular gas laser 92.

Figure 5:
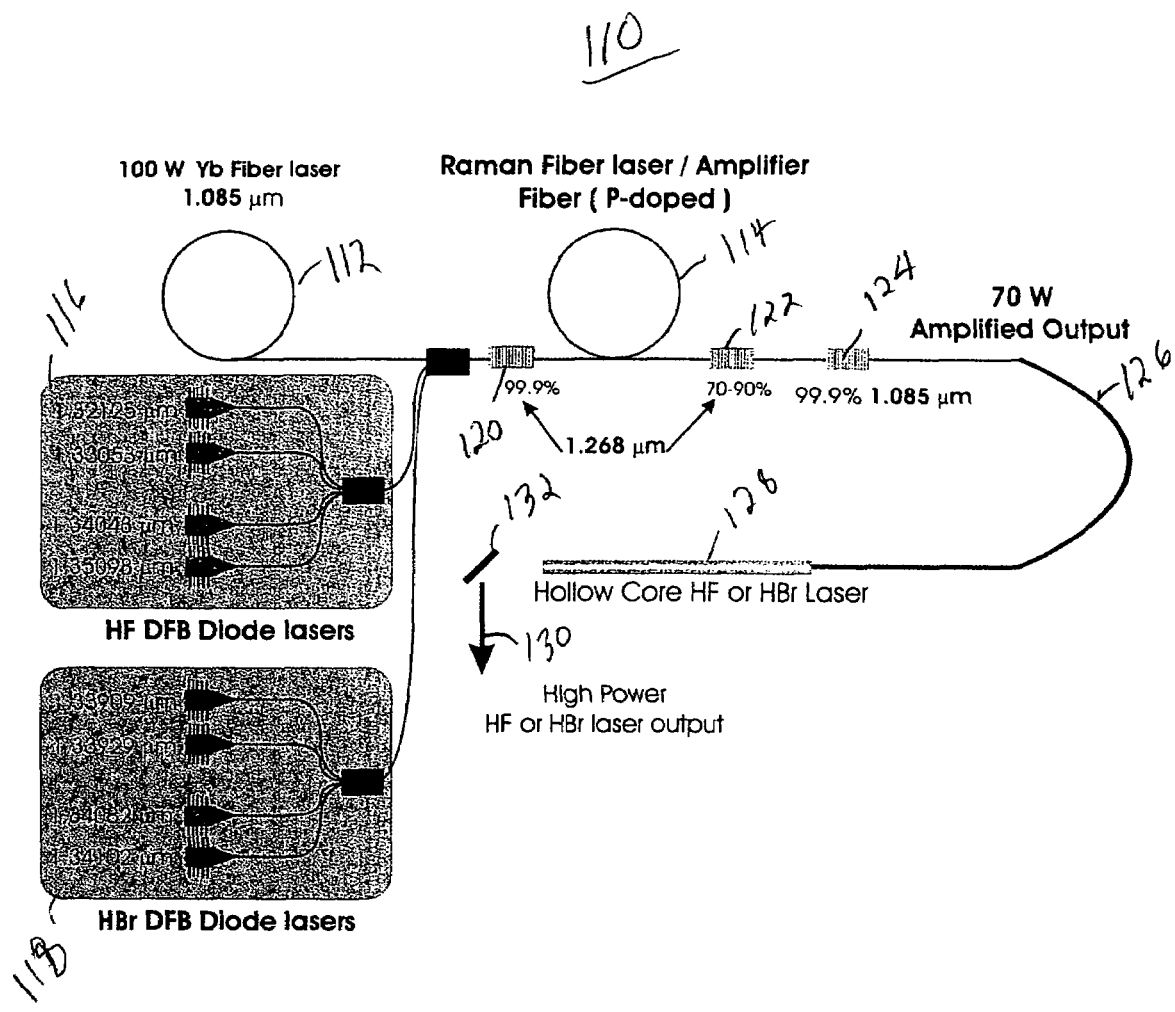
FIG. 5 is a schematic diagram of an infrared laser in accordance with one embodiment of the invention.

FIG. 5 is a schematic diagram of an infrared laser 110 in accordance with one embodiment of the invention. This figure actually shows two possible embodiments, one having an HBr gas laser and a second having a HF gas laser. Like the previous embodiments, a Yb or other rare earth doped fiber laser 112 is optically coupled to a Raman fiber laser 114. Then depending on the embodiment, either the HF laser diodes 116 or the HBr laser diodes 118 are optically coupled to the Raman laser 114. The mirrors 120 & 122 define the Raman laser cavity and the mirror 124 defines the laser cavity for the Yb fiber laser 112. The amplified output 126 is coupled by an optical fiber to a hollow core fiber filled with either HF or HBr. The gas laser 128 has its output 130 directed by an output mirror 132. Note that with slight modifications the optically resonant gas may be replaced with a Raman active gas in the molecular gas laser 128.

Figure 6:
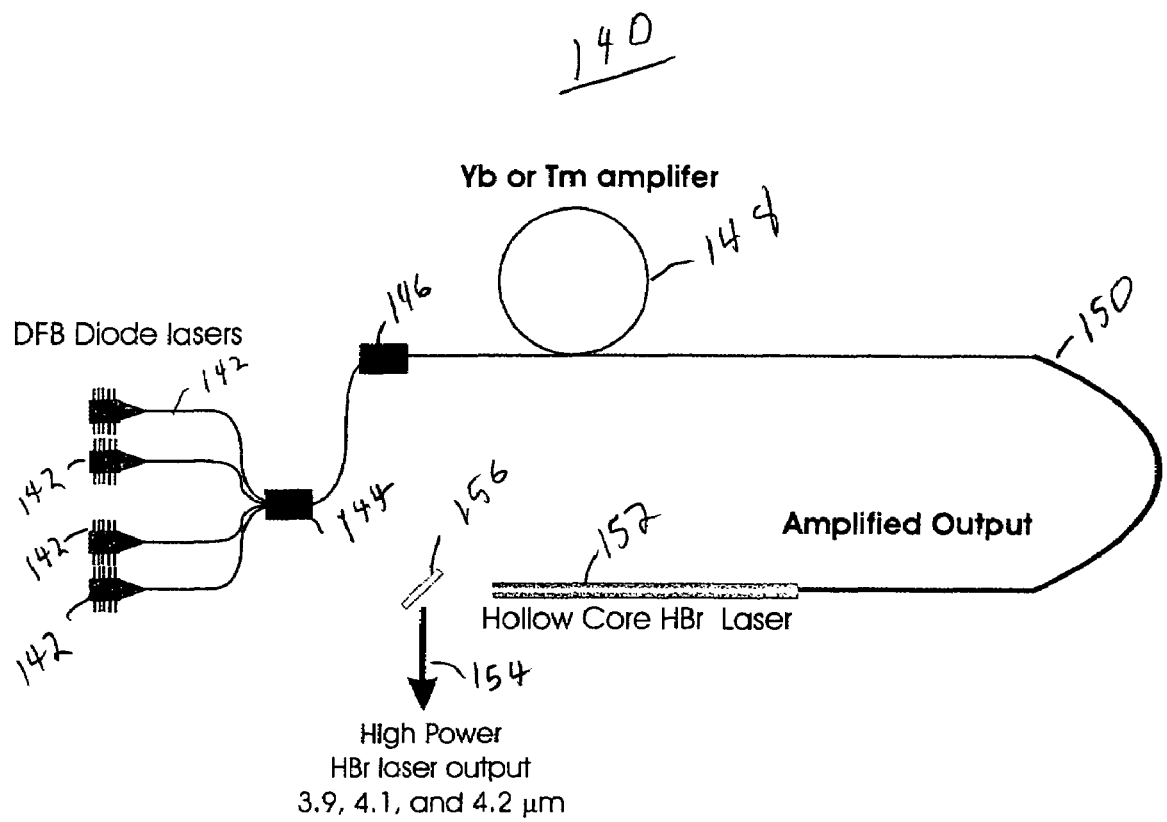
FIG. 6 is a schematic diagram of an infrared laser in accordance with one embodiment of the invention.

FIG. 6 is a schematic diagram of an infrared laser 140 in accordance with one embodiment of the invention. This laser 140 has a number of seed laser diodes 142 that are optically combined 144 and optically coupled 146 to a Yb or Tm fiber amplifier 148. Note that other rare earth fiber amplifiers may also be used. The amplified output 150 is coupled to a hollow core fiber filled with HBr gas. This forms the gas laser 152. The output 154 of the gas laser 152 is redirect by an output mirror 156.

Figure 7:
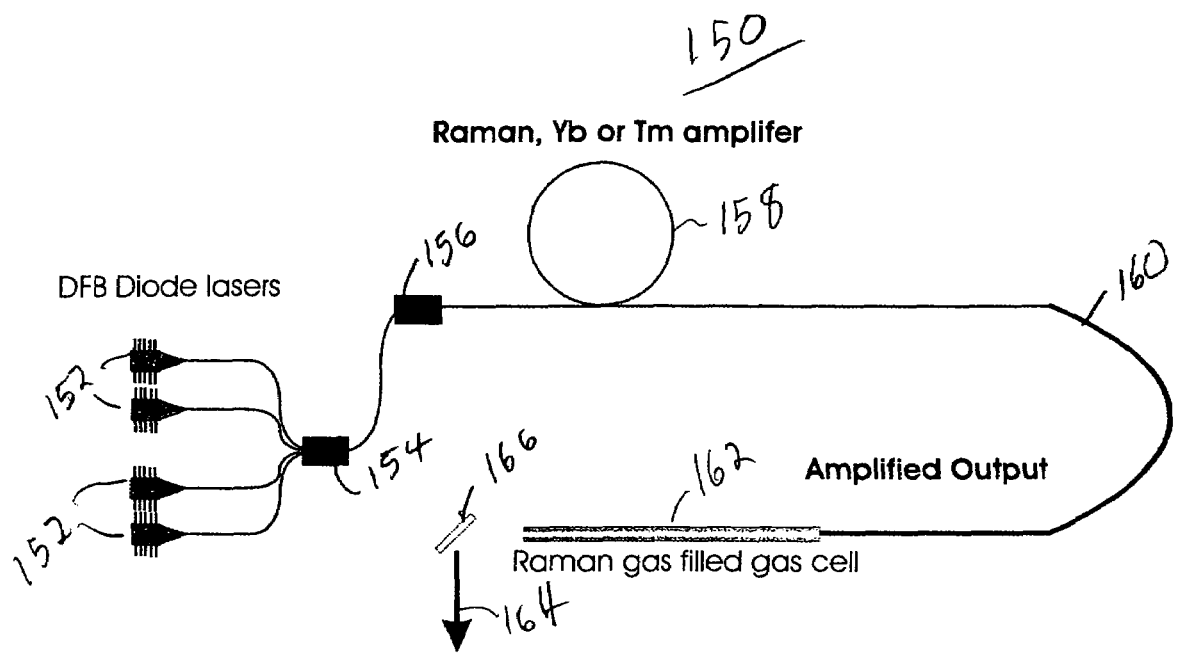
FIG. 7 is a schematic diagram of an infrared laser in accordance with one embodiment of the invention.

FIG. 7 is a schematic diagram of an infrared laser in accordance with one embodiment of the invention. This laser 150 has a number of seed laser diodes 152 that are optically combined 154 and optically coupled 156 to an Yb or Tm fiber amplifier 158. Note that other rare earth fiber amplifiers may also be used. The amplified output 160 is coupled to a hollow core fiber filled with a Raman active gas. This forms the gas laser 162. The output 164 of the gas laser 162 is redirect by an output mirror 166.

It is important to point out that all the embodiments of the lasers shown in the figures may use a doubly resonant cavity. In addition, all the embodiments of the lasers may use the feedback system described with respect to FIG. 1.

Thus there has been described an infrared laser that is energy efficient, light weight and has high output optical continuous wave power. In addition, the laser does not require hazardous or explosive chemicals.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An infrared laser, comprising:
   a seed laser having an optical output;
   a optical amplifier receiving the optical seed output and having an amplified output; and
   a molecular gas laser receiving the amplified output and having a continuous wave infrared optical output;
   a feed-back loop comprising of a detection system and servo electronics, maintains a required resonant conditions for red-shifted laser operation.

2. The laser of claim 1, wherein the molecular gas laser contains an optically resonant gas.

3. The laser of claim 1, wherein the molecular gas laser contains a Raman active gas.

4. The laser of claim 1, wherein the molecular gas laser has a doubly resonant cavity.

5. The laser of claim 1, wherein the seed laser is a diode laser.

6. The laser of claim 5, wherein the diode laser is distributed feedback diode laser.

7. The laser of claim 5, wherein the diode laser is an external cavity diode laser.

8. The laser of claim 1, wherein the seed laser is a plurality of diode lasers, each of the plurality of diode lasers having a different wavelength optical output.

9. The laser of claim 8, wherein the plurality of diode lasers are distributed feedback diode lasers.

10. The laser of claim 8, wherein the plurality of diode lasers are external cavity diode lasers.

11. The laser of claim 1, wherein the optical amplifier is a plurality of optical amplifiers, the input to each being one or a plurality of diode lasers, and the output of each being coupled to the molecular gas laser.

12. The laser of claim 1, further including a feedback system having a detector detecting the continuous wave infrared optical output and having a feedback signal.

13. The laser of claim 1, wherein the optical amplifier is an optical fiber amplifier.

14. The laser of claim 13, wherein the optical fiber amplifier is a rare earth fiber laser coupled to a Raman fiber laser/amplifier.

15. The laser of claim 14, wherein a first optical resonator of the rare earth fiber laser physically overlaps a second optical resonator of the Raman fiber laser.

16. The laser of claim 13, wherein the optical amplifier is a rare earth doped fiber amplifier.

17. The laser of claim 12, wherein the feedback signal is coupled to the seed laser.

18. The laser of claim 1, where the molecular gas laser contains CO as an optically resonant gas and the optical amplifier is an Er-doped fiber amplifier.

19. The laser of claim 1, where the molecular gas laser contains H2 as a Raman active gas and the optical amplifier is an Er-doped fiber amplifier).

20. The laser of claim 1 where the molecular gas laser contains HBr as an optically resonant gas and the optical amplifier is a Tm-doped fiber amplifier.

21. The laser of claim 1 where the molecular gas laser contains DF as an optically resonant gas and the optical amplifier is a Tm-doped fiber amplifier.

22. The laser of claim 1 where the molecular gas is flowing through a pumped region of the cell.

23. An infrared laser, comprising:
    a seed laser having a seed optical output;
    an amplifier receiving the seed optical output and having an amplified output; and
    a gas molecular laser pumped by the amplified output and having a continuous wave infrared output, the gas molecular laser having a doubly resonant cavity.

24. The laser of claim 23, wherein the amplifier is a fiber amplifier.

25. The laser of claim 24, wherein the gas molecular laser contains a Raman active gas.

26. The laser of claim 25, wherein the Raman active gas is contained in a hollow core optical fiber.

27. An infrared laser, comprising:
    a plurality of seed lasers, each of the plurality of seed lasers having an optical output at a different wavelength;
    a fiber amplifier receiving the optical output from each of the plurality of seed lasers and having an amplified optical output;
    a molecular gas laser pumped by the amplified optical output and having a continuous wave lasing at an infrared wavelength;
    a feedback system detecting a power of the molecular gas laser and adjusting at least one of the different wavelengths of the one of the plurality of seed lasers.

28. The laser of claim 27, wherein the fiber amplifier includes a Raman fiber laser.

29. The laser of claim 28, wherein the Raman fiber laser is pumped by a rare earth fiber laser.

* * * * *